(12) United States Patent
Paunoiu et al.

(10) Patent No.: US 12,701,020 B2
(45) Date of Patent: Aug. 4, 2026

(54) SHARDED MERKLE TREE

(71) Applicant: nChain Licensing AG, Zug (CH)

(72) Inventors: Alexandru Paunoiu, London (GB);
Craig Steven Wright, London (GB);
Alexander Graham, London (GB)

(73) Assignee: nChain Licensing AG, Zug (CH)

( * ) Notice: Subject to any disclaimer, the term of this
patent is extended or adjusted under 35
U.S.C. 154(b) by 95 days.

(21) Appl. No.: 18/700,531

(22) PCT Filed: Oct. 21, 2022

(86) PCT No.: PCT/EP2022/079462
§ 371 (c)(1),
(2) Date: Apr. 11, 2024

(87) PCT Pub. No.: WO2023/072778
PCT Pub. Date: May 4, 2023

(65) Prior Publication Data
US 2025/0233764 A1     Jul. 17, 2025

(30) Foreign Application Priority Data

Oct. 28, 2021     (GB) ..................................... 2115522

(51) Int. Cl.
H04L 9/00         (2022.01)
H04L 9/32         (2006.01)

(52) U.S. Cl.
CPC .............. H04L 9/50 (2022.05); H04L 9/3236
(2013.01)

(58) Field of Classification Search
CPC ....... H04L 9/50; H04L 9/3236; H04L 9/3239;
G06F 16/27; G06F 21/64
See application file for complete search history.

(56) References Cited

U.S. PATENT DOCUMENTS

| | | | | |
|---|---|---|---|---|
| 10,896,171 | B2 * | 1/2021 | Winarski ............ | G06F 16/2246 |
| 2015/0278030 | A1 * | 10/2015 | Zhu ........................ | G06F 16/275 |
| | | | | 707/623 |
| 2018/0189312 | A1 * | 7/2018 | Alas ...................... | H04L 9/3239 |
| 2020/0052886 | A1 * | 2/2020 | Buldas .................. | H04L 9/3247 |
| 2020/0213089 | A1 * | 7/2020 | Yang ..................... | H04L 9/3265 |

(Continued)

FOREIGN PATENT DOCUMENTS

CN          111581214 A        8/2020

OTHER PUBLICATIONS

"Mandala Network", Bitcoin Wiki, Nov. 19, 2020, Bitcoin Association, URL: https://wiki.bitcoinsv.io/index.php/Mandala_
Network.

(Continued)

*Primary Examiner* — Blake I Narramore
(74) *Attorney, Agent, or Firm* — Galvani Smith PLLC

(57)          ABSTRACT
A computer-implemented method of representing a first set
of data items, wherein the method is performed by a first tree
generator and comprises: allocating the first set of data items
into a plurality of respective subsets; for each respective
subset of data items, generating a respective hash tree based
on the respective subset of data items, wherein the respective
hash tree comprises a respective root node; and generating
a respective first hash set representing the first set of data
items, wherein the first hash set comprises each of the
respective root nodes.

18 Claims, 9 Drawing Sheets

(56)  References Cited

U.S. PATENT DOCUMENTS

| | | | | |
|---|---|---|---|---|
| 2020/0213094 | A1* | 7/2020 | Yang ..................... | H04L 9/3297 |
| 2020/0320204 | A1* | 10/2020 | Venable, Sr. ......... | H04L 9/0637 |
| 2021/0232594 | A1* | 7/2021 | Solan .................. | G06F 16/2246 |
| 2021/0243009 | A1* | 8/2021 | Kawahara ............. | H04L 9/3239 |
| 2021/0349967 | A1* | 11/2021 | Palyutina ........... | G06Q 30/0273 |
| 2022/0029815 | A1* | 1/2022 | Basu .................... | H04L 9/3236 |
| 2022/0318779 | A1* | 10/2022 | Bathen ............. | G06Q 20/38215 |

OTHER PUBLICATIONS

GB2115522.1 Combined Search and Examination Report dated May 4, 2022, 6 pages.

Nakamura Yuta et al: "Content-defined Merkle Trees for Efficient Container Delivery", 2020 IEEE 27th International Conference on High Performance Computing, Data, and Analytics (HIPC), IEEE, Dec. 16, 2020 (Dec. 16, 2020), pp. 121-130.

PCT/EP2022/079462 International Search Report and Written Opinion dated Feb. 14, 2023, 13 pages.

Shadders, Steve, "Merkle proof standardised format", Bitcoin SV Technical Standards, Sep. 6, 2021, Bitcoin Association for BSV, URL: https://tsc.bitcoinassociation.net/standards/merkle-proof-standardised-format/.

Wikipedia Contributors, "Edge computing," Wikipedia, The Free Encyclopedia, https://en.wikipedia.org/wiki/Edge_computing.

Wikipedia Contributors, "Merkle tree," Wikipedia, The Free Encyclopedia, https://en.wikipedia.org/w/index.php?title=Merkle_tree.

* cited by examiner

Transaction
from Alice to Bob

↓

Validated by running: Locking
script from output 203 of $Tx_0$,
together with Alice's unlocking
script from input 202 of $Tx_1$. This
checks that Alice's unlocking script
in $Tx_1$ meets the condition(s)
defined in the locking script of
previous transaction $Tx_0$.

Figure 7

| |
|---|
| Merkle tree shard (2 nodes) |
| Coinbase Merkle tree shard (4 nodes) |
| Fees |
| 6 |
| $Tx_1$ |
| ... |
| $Tx_6$ |

800

900

SHARDED MERKLE TREE

CROSS REFERENCE TO RELATED APPLICATIONS

This application is the U.S. National Stage of International Application No. PCT/EP2022/079462 filed on Oct. 21, 2022, which claims the benefit of United Kingdom Patent Application No. 2115522.1, filed on Oct. 28, 2021, the contents of which are incorporated herein by reference in their entireties.

TECHNICAL FIELD

The present disclosure relates to a method of representing a set of data items using root hashes of multiple hash trees. In some examples, the data items are blockchain transactions and the multiple root hashes are used to construct a block Merkle root of a block of transactions.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

SUMMARY

A hash tree, or a Merkle tree, is a tree in which every leaf node is a hash (e.g. a cryptographic hash) of a data item, and every non-leaf node is a (cryptographic) hash of its child nodes. Hash trees allow efficient and secure verification of a set of data items. A hash tree is normally constructed, in one go, based on the entire set of data items. In other words, the constructor of the hash tree requires access to the entire set of data items and alone constructs the hash tree. This is inefficient in terms of storage requirements (the tree constructor must store or otherwise have access to all of the data items) and in terms of processing requirements (a single tree constructor must process the entire set of data items).

In the current implementation of the Bitcoin node software, transaction validation and block creation are single threaded. This means that transaction validation and block creation do not benefit from current processing units that can handle parallelism. Block creation involves, amongst other things, constructing a Merkle root of the set of transactions that form a block. This is known as the block Merkle root. The present disclosure provides a mechanism that enables the construction of the block Merkle root to be parallelised, e.g. once the transactions have been validated. The present disclosure recognises that the block Merkle root of a transaction set can be computed in parallel from several smaller Merkle trees in order to enable this parallelisation. Note that Bitcoin is just one example blockchain protocol and this applies equally to other protocols.

According to one aspect disclosed herein, there is provided a computer-implemented method of representing a first set of data items, wherein the method is performed by a first tree generator and comprises: allocating the first set of data items into a plurality of respective subsets; for each respective subset of data items, generating a respective hash tree based on the respective subset of data items, wherein the respective hash tree comprises a respective root node; and generating a respective first hash set representing the first set of data items, wherein the first hash set comprises each of the respective root nodes.

According to one aspect disclosed herein, there is provided a computer-implemented method of generating an overall root node representing an overall set of data items, wherein the method is performed by a root generator and comprises: obtaining one or more respective hash sets, wherein each respective hash set is generated by: allocating a respective set of data items into a plurality of respective subsets, and for each respective subset of data items, generating a respective hash tree based on the respective subset of data items, wherein the respective hash tree comprises a respective root node, and wherein the respective hash set comprises each of the respective root nodes; and generating the root node based on each respective root node.

A tree generator has access to a first set of transactions. Rather than constructing a conventional Merkle tree based on each of the first set of transactions, the first set of transactions are instead split into subsets, where each subset includes $2^n$ transactions, where n may, and often will, vary between the subsets. Now, a Merkle tree is constructed for each subset of transactions, each Merkle tree having a respective Merkle root. Each Merkle root is stored in a hash set (also referred to herein as a "Merkle tree shard"). The Merkle roots are ordered in the Merkle tree shard based on the respective number of transactions on which the respective Merkle root was generated, e.g. from the highest number of transactions to the lowest number of transactions. The Merkle tree shard thus represents the first set of transactions.

Another tree generator (or even the same tree generator) may have access to a second set of transactions. This tree generator may perform the same process of generating a Merkle tree shard based on and representing the second set of transactions. In general, any number of Merkle tree shards may be generated, each for a respective set of transactions. The Merkle shards may then be merged in order to generate an overall Merkle root that represents all of the transactions contained in all of the sets. In the case that a block of transactions comprises each set of transactions, the overall Merkle root will be the block Merkle root. Each tree generator may construct their respective Merkle tree shard in parallel, thus enabling the parallelisation of the block Merkle root.

In some embodiments, a set of transactions may be split into the minimum number of subsets, thus increasing the efficiency of generating the respective Merkle tree shard as fewer Merkle trees are constructed per transaction set.

In some embodiments, one of the transactions may not be available at the time of constructing one or more respective Merkle roots of a given Merkle tree shard. The present disclosure provides a technique for constructing a partial Merkle tree shard (also referred to herein as a "Coinbase Merkle tree shard" which enables the Merkle tree shard to be constructed once the missing transaction is available. In some examples, the missing transaction is the generation ("Coinbase") transaction that appears first in a block of transactions.

According to one aspect disclosed herein, there is provided a computer-implemented method of generating a block root node representing a block of blockchain transactions, wherein the method comprises: obtaining a plurality of respective sub-block headers, each respective sub-block header being associated with a respective group of blockchain transactions comprising a respective placeholder blockchain transaction and a respective set of blockchain transactions, wherein respective each sub-block header comprises a respective first hash set and a respective second hash set; wherein the respective first hash set is generated by: allocating the respective set of data items into a plurality of respective subsets; for each respective subset of data items, generating a respective hash tree based on the respective subset of data items, wherein the respective hash tree comprises a respective root node, and wherein the respective first hash set comprises each of the respective root nodes; wherein the respective second hash set is generated by: allocating the respective first group of data items into a plurality of respective subsets, and wherein a first subset comprises the respective placeholder data item; for the first subset of data items, generating a hash proof for the placeholder item based on each other data item in the first subset; for each other respective subset of data items, generating a respective hash tree based on the respective subset of data items, wherein the respective hash tree comprises a respective root node, and wherein the respective second hash set comprises the hash proof for the respective placeholder data item and each of the respective root nodes, and wherein the method further comprises: determining which respective sub-block header is associated with the respective group of blockchain transactions comprising the most blockchain transactions; generating a generation transaction; and generating the block root node based on i) the generation transaction, ii) the respective second hash set of the respective sub-block header associated with the respective group of blockchain transactions comprising the most blockchain transactions, and iii) the respective first hash set of each other respective sub-block header.

A block root generator may obtain multiple sub-blocks, each pertaining to a respective set of transactions that are to be included in a block of the blockchain. Traditionally, a single blockchain node has been responsible for constructing the Merkle tree that represents the transactions in the block. The present disclosure instead enables parts of the Merkle tree (referred to herein as "Merkle tree shards") to be constructed by different entities ("tree generators") in parallel, thus making the process faster and more efficient. It also means that no single entity requires access to all of the transactions, thus reducing the storage requirements for a given entity. The present disclosure also provides a mechanism for allowing a generation (or "coinbase") transaction to be added to the block Merkle tree after some or all of the Merkle tree shards have been generated.

Note that whilst embodiments are primarily described in terms of the data items being blockchain transactions, more generally the data items may relate to any type of data, such as, for example, emails, banking records, media files, IoT logs, etc.

Note also that whilst embodiments are primarily described in terms of hash trees being binary hash trees (i.e. Merkle trees), in general the hash trees may be any n-ary trees. In that case, transactions are allocated into subsets comprising a power of n transactions.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

1. Example System Overview

Figure 1:
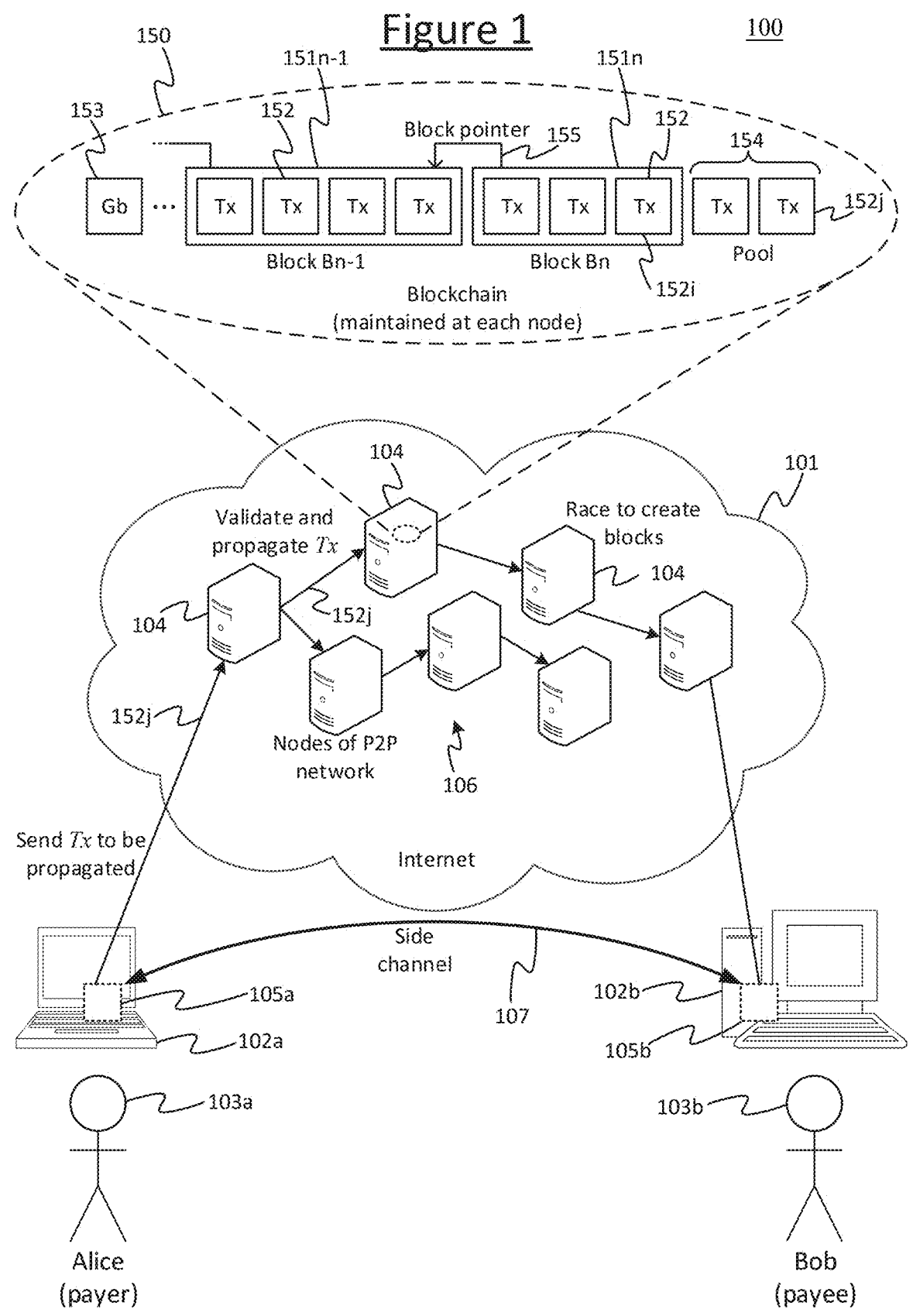
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152j, the (or each) input comprises a pointer referencing the output of a preceding transaction 152*i* in the sequence of transactions, specifying that this output is to be redeemed or "spent" in the present transaction 152*j*. Spending or redeeming does not necessarily imply transfer of a financial asset, though that is certainly one common application. More generally spending could be described as consuming the output, or assigning it to one or more outputs in another, onward transaction. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction spends (or "assigns"), wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned (or "spent") is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. The significant amount of effort, for example in the form of hash, required to create a proof-of-work solution signals the intent of the first node 104 to follow the rules of the blockchain protocol.

Such rules include not accepting a transaction as valid if it spends or assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151$n$ and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151$n$. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151$n$ in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103$a$ and his/her respective computer equipment 102$a$, and a second party 103$b$ and his/her respective computer equipment 102$b$. It will be understood that many more such parties 103 and their respective computer equipment 102 may be present and participating in the system 100, but for convenience they are not illustrated. Each party 103 may be an individual or an organization. Purely by way of illustration the first party 103$a$ is referred to herein as Alice and the second party 103$b$ is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility).

The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any blockchain node 104 that receives the transaction 152j will add the new validated transaction 152 to the ordered set of transactions 154 maintained at that blockchain node 104. Further, any blockchain node 104 that receives the transaction 152j will propagate the validated transaction 152 onward to one or more other blockchain nodes 104 in the network 106. Since each blockchain node 104 applies the same protocol, then assuming the transaction 152j is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

2. UTXO-Based Model

Figure 2:
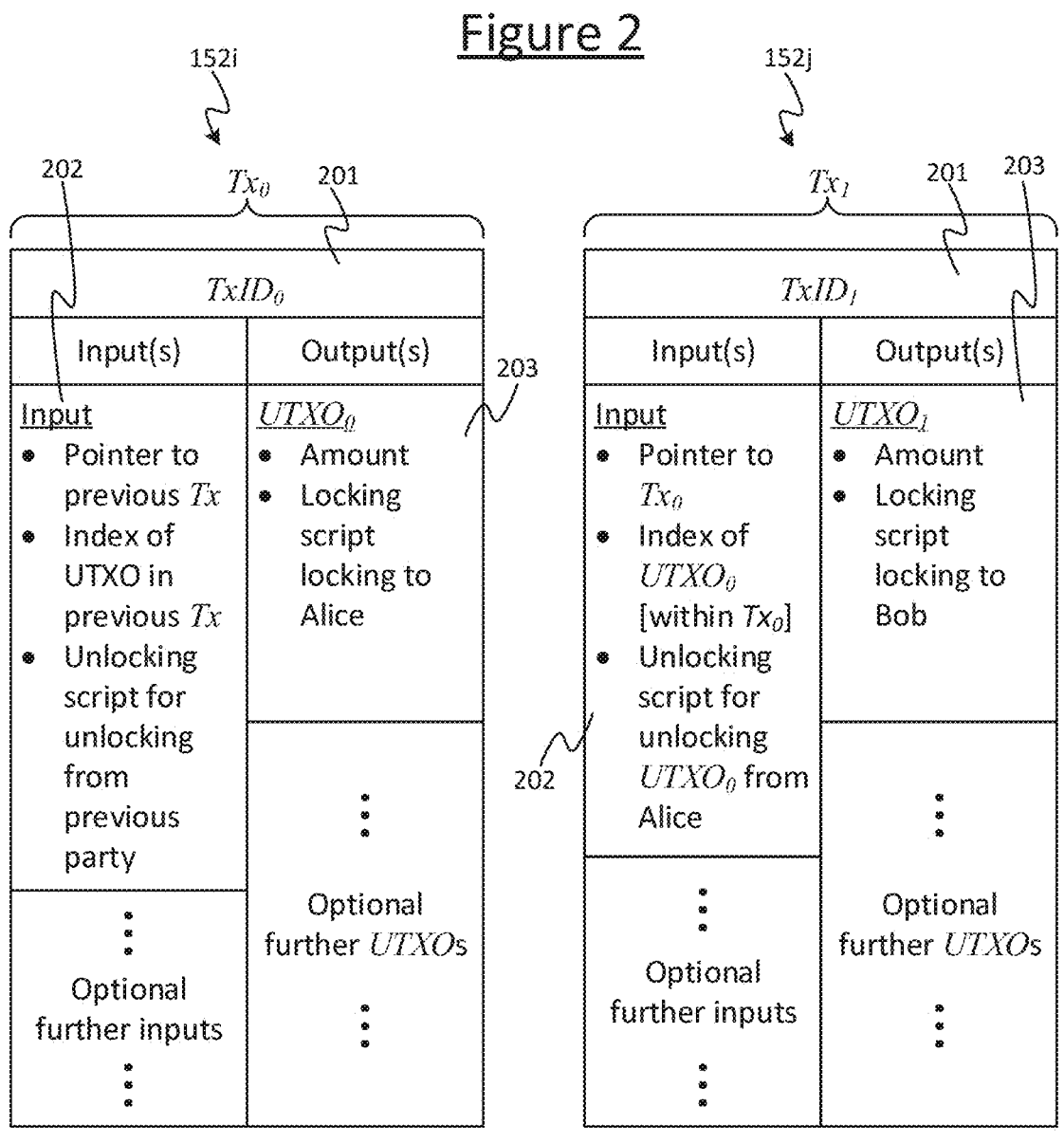
FIG. 2 schematically illustrates some examples of transactions which may be recorded in a blockchain, FIG. 3 schematically illustrates a Merkle tree representing four transactions.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103a wishes to create a transaction 152j transferring an amount of the digital asset in question to Bob 103b. In FIG. 2 Alice's new transaction 152j is labelled "Tx$_1$". It takes an amount of the digital asset that is locked to Alice in the output 203 of a preceding transaction 152i in the sequence, and transfers at least some of this to Bob. The preceding transaction 152i is labelled "Tx$_0$" in FIG. 2. Tx$_0$ and Tx$_1$ are just arbitrary labels. They do not necessarily mean that Tx$_0$ is the first transaction in the blockchain 151, nor that Tx$_1$ is the immediate next transaction in the pool 154. Tx$_1$ could point back to any preceding (i.e. antecedent) transaction that still has an unspent output 203 locked to Alice.

The preceding transaction Tx$_0$ may already have been validated and included in a block 151 of the blockchain 150 at the time when Alice creates her new transaction Tx$_1$, or at least by the time she sends it to the network 106. It may already have been included in one of the blocks 151 at that time, or it may be still waiting in the ordered set 154 in which case it will soon be included in a new block 151. Alternatively Tx$_0$ and Tx$_1$ could be created and sent to the network 106 together, or Tx$_0$ could even be sent after Tx$_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction Tx$_0$ comprises a particular UTXO, labelled here UTXO$_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, UTXO$_0$ in the output 203 of Tx$_0$ comprises a locking script [Checksig P$_A$] which requires a signature Sig P$_A$ of Alice in order for UTXO$_0$ to be redeemed (strictly, in order for a subsequent transaction attempting to redeem UTXO$_0$ to be valid).

[Checksig P$_A$] contains a representation (i.e. a hash) of the public key P$_A$ from a public-private key pair of Alice. The input 202 of Tx$_1$ comprises a pointer pointing back to Tx$_1$ (e.g. by means of its transaction ID, TxID$_0$, which in embodiments is the hash of the whole transaction Tx$_0$). The input 202 of Tx$_1$ comprises an index identifying UTXO$_0$ within Tx$_0$, to identify it amongst any other possible outputs of Tx$_0$. The input 202 of Tx$_1$ further comprises an unlocking script <Sig P$_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction Tx$_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

$$< SigP_A > \ < P_A > ||[Checksig \ P_A]$$

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key P$_A$ of Alice, as included in the locking script in the output of Tx$_0$, to authenticate that the unlocking script in the input of Tx$_1$ contains the signature of Alice signing the expected portion of data. The expected portion of data itself (the "message") also needs to be included in order to perform this authentication. In embodiments the signed data comprises the whole of Tx$_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned (or spent) by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_ . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

3. Side Channel

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain"

communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

4. Merkle Trees

Merkle trees, are hierarchical data structures that enable secure verification of collections of data, e.g. blockchain transactions. Each node in a Merkle tree has an index set {i, i+1, . . . , j} that is dependent on its position in the tree, represented by $N_{\{i,i+1, . . . , j\}}$.

Figure 3:
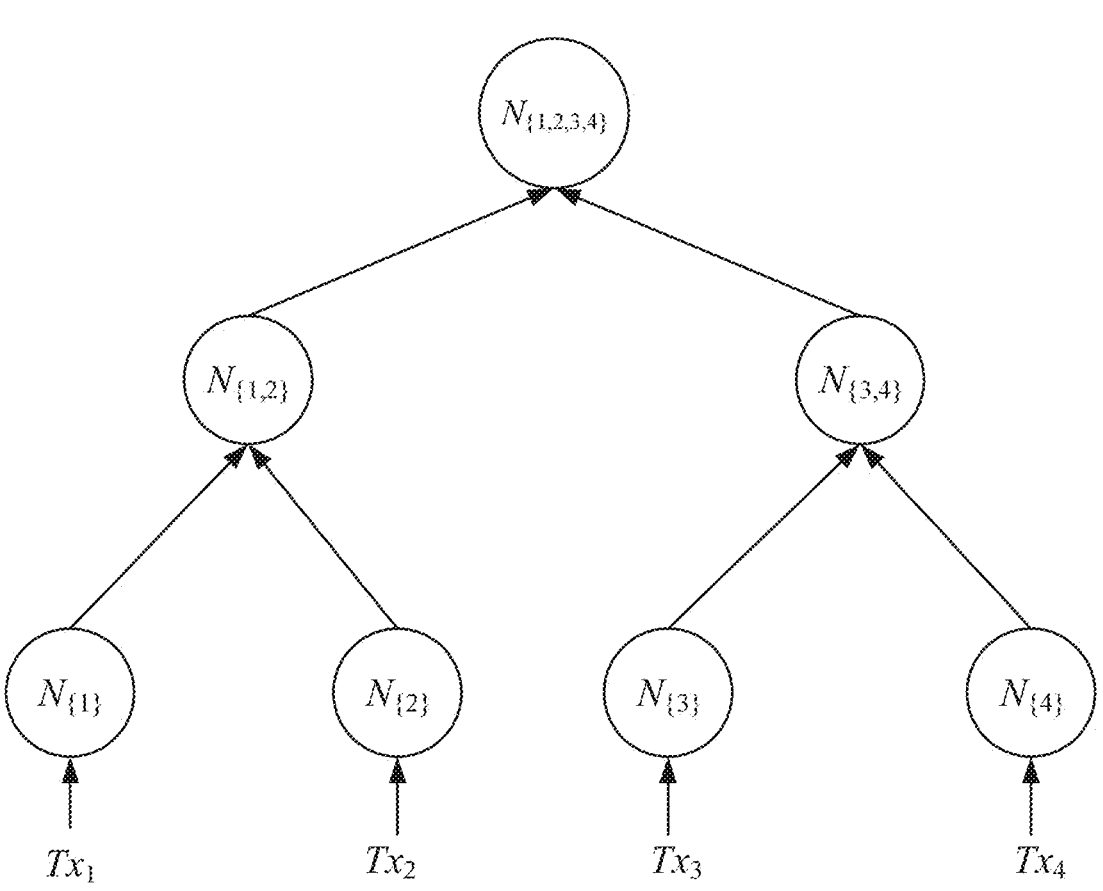

Assume a set of n transactions. Given a binary Merkle tree in a blockchain header, the construction of its nodes is governed by:

$$N_{\{i,i+1,\dots,j\}} = \begin{cases} H(Tx_i) & i = j \\ H(N_{\{i,i+1,\dots,k\}}\|N_{\{k+1,k+2,\dots,j\}}) & i \neq j, k+1 \leq n, \\ H(N_{\{i,i+1,\dots,k\}}\|N_{\{i,i+1,\dots,k\}}) & i \neq j, k+1 > n \end{cases}$$

where $k=(i+j-1)/2$, $1 \leq i$, $j \leq 2^{\lceil log_2 n \rceil}$, H is a cryptographic hash function and $Tx_i$ is the ith transaction. A binary Merkle tree constructed according to these equations is shown in FIG. 3.

Given a node $N_I$ where $I=\{i_1, i_2, . . . , i_\alpha\}$, we define the level l of $N_I$ as $\lceil log_2 \alpha \rceil$. For example, the root of the tree in FIG. 1 has level l=2 and the leaves are on level l=0.

The Merkle tree data structure enables us to efficiently verify that some transaction $Tx_i$ is a member of a set of n transactions $\mathcal{T} \in \{Tx_1, . . . , Tx_n\}$, using a Merkle proof denoted by $\mathcal{P}_{i,n}$, where this is the set of nodes required to compute the Merkle root given $Tx_i$ and $\mathcal{P}_{i,n}$. We denote this set of nodes as $\{P_1, P_2, . . . , P_p\}$.

To verify that $Tx_1$ is in the set of transactions $Tx_1, . . . , Tx_4$ we only need the Merkle proof $\mathcal{P}_{1,4}=\{N_{\{2\}}, N_{\{3,4\}}\}$ and we execute the following steps:

1. Compute $N_{\{1\}}=H(Tx_1)$.
2. Compute $N'_{\{1,2\}}=H(N_{\{1\}}\|N_{\{2\}})$.
3. Compute $N'_{\{1,2,3,4\}}=H(N_{\{1,2\}}\|N_{\{3,4\}})$.
4. Accept $Tx_1$ as being in the set if $N_{\{1,2,3,4\}}=N'_{\{1,2,3,4\}}$, otherwise reject.

5. Sharded Merkle Trees

Figure 4:
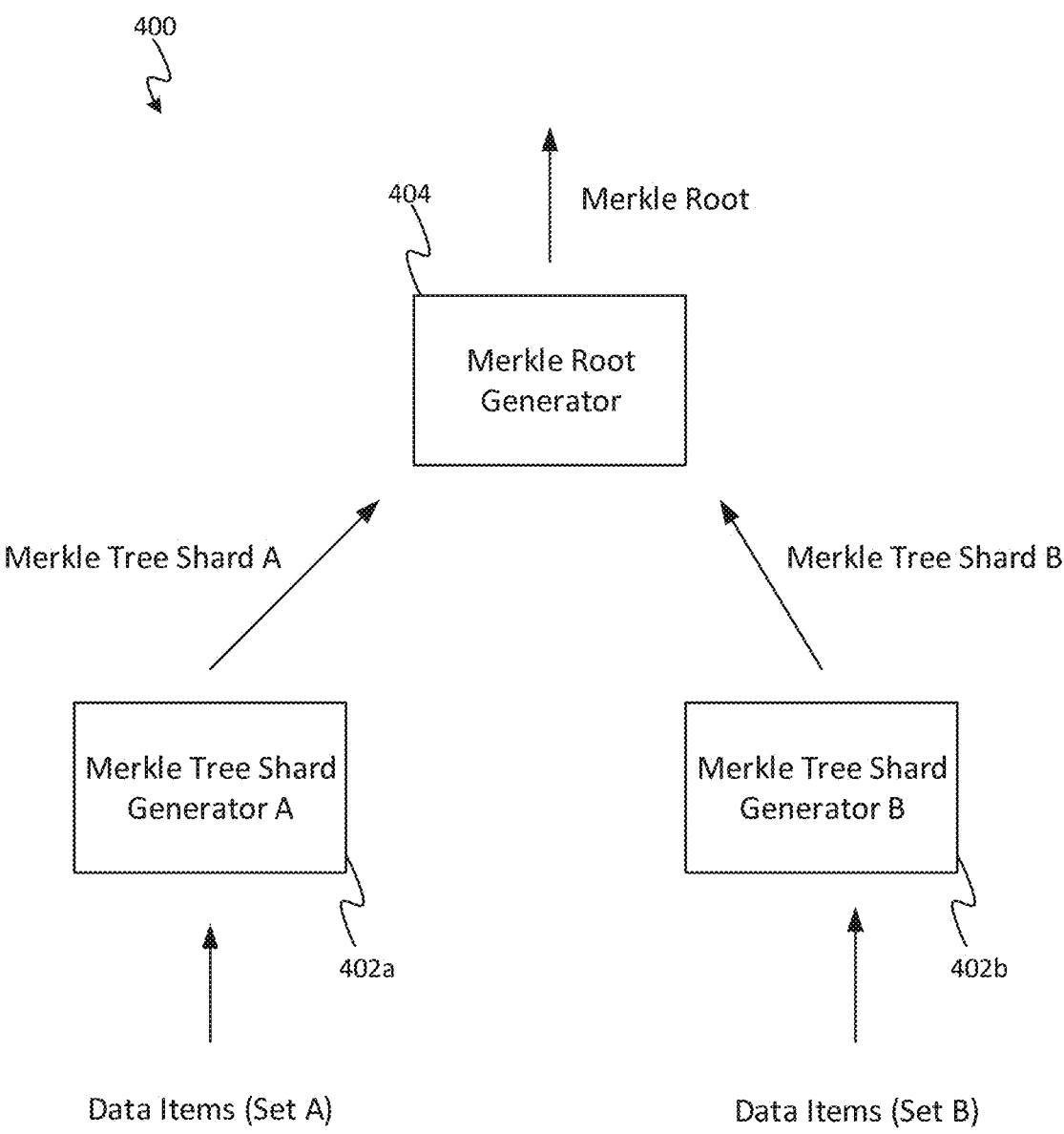
FIG. 4 is a schematic block diagram of a system for constructing Merkle tree shards, FIG. 5 schematically illustrates an example of merging multiple Merkle trees, FIG. 6 schematically illustrates another example of merging multiple Merkle trees, where one of the Merkle trees comprises a prepended placeholder transaction, FIG. 7 schematically illustrates an example subblock structure for six transactions.

FIG. 4 illustrates an example system 400 for generating a Merkle root. As shown, the system 400 may comprise one or more Merkle tree shard generators 402, or simply "tree generators" 402. Only two tree generators 402a 402b are shown in FIG. 4 but the system 400 may comprise any number of tree generators 402. A "Merkle tree shard" is a term used herein to describe a hash set (i.e. a set of hashes) that represents a set of data items, and each tree generator 402 is configured to generate a respective Merkle tree shard. For instance, tree generator A 402a may generate Merkle tree shard A for data items (set A) and tree generator B 402b may generate Merkle tree shard A for data items (set A). Merkle tree shards will be described in detail below. The system 400 comprises a Merkle root generator 404, or simply a "root generator" 404. The root generator 404 is configured to generate a Merkle root based on one or more Merkle tree shards. In the example of FIG. 4, the root generator 404 is shown as being separate from each tree generator 402 but it is not excluded that the root generator 404 may also take the role as, or be comprised by, one of the tree generators 402.

The construction of a Merkle tree shard will now be described. A first tree generator, e.g. tree generator A 402a, is tasked with representing a first set of data items. In the following examples, the data items are blockchain transactions, but it will be appreciated that this is merely for illustrative purposes and in general the data items may be any type of data. The first tree generator 402a allocates (i.e. assigns, or distributes) the first set of transactions into a plurality of subsets. Each transaction belongs to only one subset, and together the plurality of subsets form the entire set of transactions. Furthermore, the number of transactions allocated to each subset is a power of the same number (e.g. 2, 3, 4, etc.). In the case that the number of transactions allocated to each subset is a power of 2, the resulting trees are binary Merkle trees. More generally, if the number of transactions allocated to each subset is a power of n, the resulting hash trees are n-ary Merkle trees.

One or more subsets may include different numbers of transactions, so long as the number of transactions in each subset is a power of the same number, e.g. 2. Similarly, one or more subsets may include the same number of transactions. In some examples, the transactions are divided into the minimum number of subsets that satisfy the requirements set out above.

The transactions may have an order. The order may be respected when allocating the transactions into subsets. E.g. the first transaction in the first subset is the first transaction in the ordered list of transactions and the final transaction in the final subset is the final transaction in the ordered list of transactions.

The first tree generator 402a generates a respective Merkle tree for each respective subset of transactions. For instance, if the transactions are allocated into three subsets, three Merkle trees are generated, one for each subset. Each Merkle tree comprises a respective Merkle root. Therefore the first tree generator 402a generates a number of Merkle roots corresponding to the number of subsets into which the transactions are allocated. The Merkle roots may be placed in order in a first Merkle tree shard ("hash set") based on the number of transactions upon which the respective Merkle tree was generated. That is, the first Merkle root in the first Merkle tree shard may be the Merkle root that was constructed based on the highest number of transactions. The final Merkle root in the first Merkle tree shard may be the Merkle root that was constructed based on the smallest number of transactions.

The first tree generator 402a may perform the same process to generate a respective Merkle tree shard for one or more different respective sets of transactions. Similarly, a second tree generator, e.g. tree generator B 402b, may perform the same process to generate a respective Merkle tree shard for one or more different sets of transactions. For instance, the second tree generator 402a may generate a second Merkle tree shard for a second set of transactions.

Together, the different sets of transactions may form a larger, overall set of transactions. That is, each set of transactions may be a subset of the overall set of transactions. In some examples, the overall set of transactions is a blockchain block, or a candidate for a blockchain block. Each set of transactions comprises part of the (candidate) block.

The first tree generator 402a may send the first Merkle tree shard to the root generator 404 for generating a Merkle root based on the first Merkle tree shard and one or more additional Merkle shards. Similarly, the second tree generator may send the second Merkle tree shard to the tree generator 404 for generating the Merkle root. The Merkle root represents the overall set of transactions.

Alternatively, the first tree generator 402a may obtain (e.g. generate and/or receive) one or more additional Merkle tree shards and generate a Merkle root based on the first Merkle tree shard and the one or more additional Merkle tree shards. For example, the second tree generator 402b may send the second Merkle tree shard to the first tree generator 402b.

Each Merkle tree shard comprises an ordered list of Merkle roots, where each Merkle root represents a subset of transactions. The different Merkle tree shards may be used to generate an overall Merkle root that represents the entire set of transactions, i.e. the overall set of transactions mentioned above. This process is referred to herein as merging Merkle trees.

Each Merkle root in (i.e. belonging to) a Merkle tree shard is associated with a respective tree level 1. The tree level/ indicates how many levels are in the respective Merkle tree that comprises the Merkle root. For instance, in the example of FIG. 3, the Merkle root has a tree level of 2 (assuming the leaves, i.e. the transactions, are on level 0). The tree level is dependent on the number of transactions that the Merkle tree is based upon. A Merkle tree generated based on a higher number of transactions will have a Merkle root whose tree level is higher than that of a Merkle tree generated based on a smaller number of transactions.

To generate the overall Merkle root, the Merkle roots of the different Merkle tree shards are arranged in order based on their respective tree levels, from the lowest tree level to the highest tree level. Then, starting with the lowest tree level 1, the following process is performed. If there is only a single Merkle root belonging to that level 1, and there are no Merkle roots on any higher tree level, then that Merkle root is the overall Merkle root. If there is only a single Merkle root belonging to that level/and there are Merkle roots on any higher tree level, the single Merkle root is duplicated. For each level/with two or more Merkle roots, the first two Merkle roots are concatenated and hashed, with the output added to the next tree level 1+1. If that next tree level 1+1 already comprises a list of one or more Merkle roots, the output is appended to the list of Merkle roots. The two Merkle roots that were concatenated are removed from the level 1. If the level contains no more Merkle roots, then the process repeats for the next level 1+1. The process repeats until there is only a single Merkle root remaining, which is the overall Merkle root representing the overall set (e.g. block) of transactions.

Figure 5:
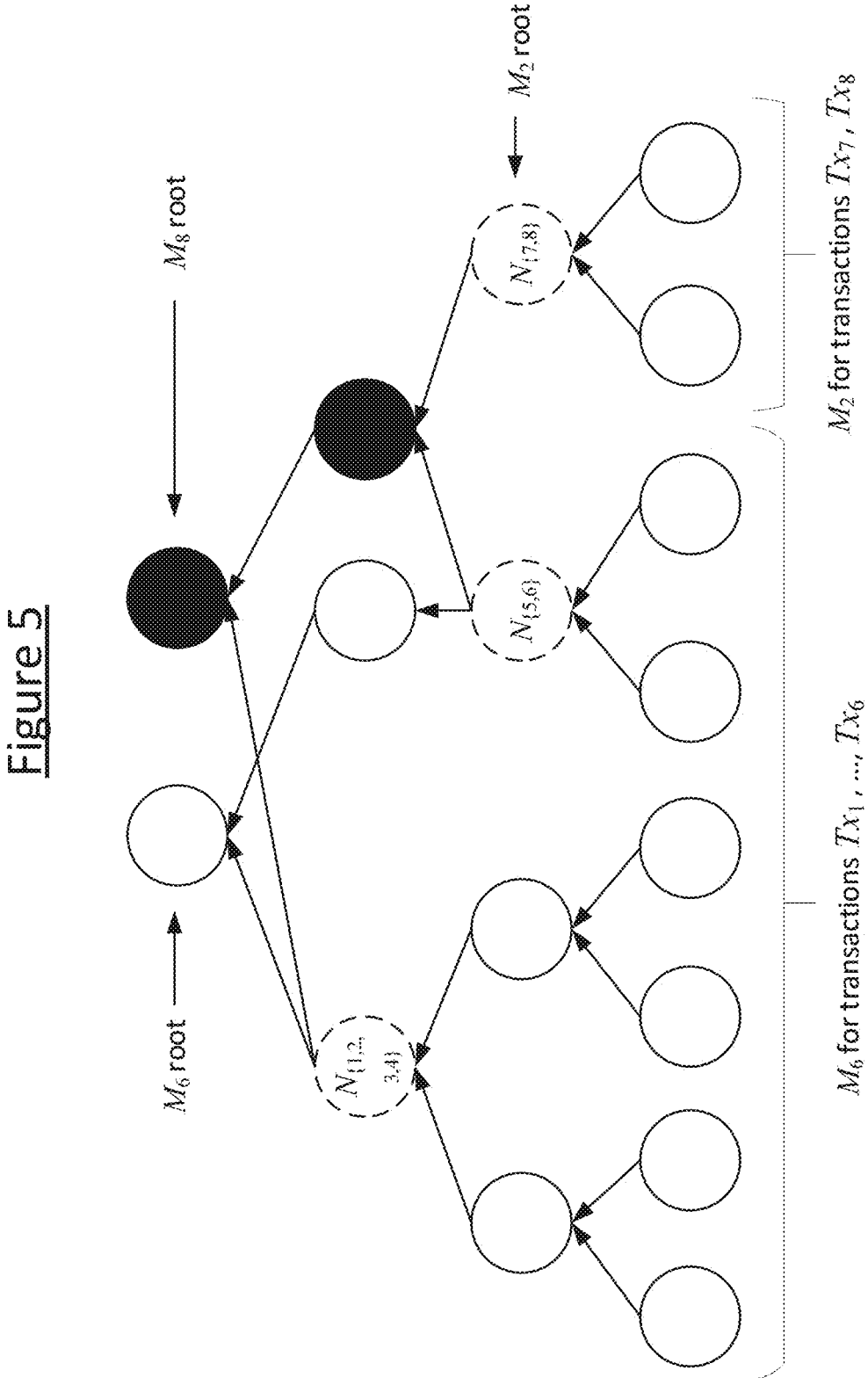

FIG. 5 illustrates an example of how multiple Merkle tree shards can be generated and merged to form an overall Merkle root. A first Merkle tree shard is generated based on a first set of six transactions and a second Merkle tree shard is generated based on a second set of two transactions. The first set of transactions is divided into two subsets, each having a power of 2 transactions. A first one of the subsets comprises four transactions and a second one of the subsets comprises two transactions. A Merkle tree is generated for each subset. The Merkle root of the first subset having four transactions is labelled $N_{\{1,2,3,4\}}$. The Merkle root of the second subset having two transaction is labelled $N_{\{5,6\}}$. The first Merkle tree shard representing the first set of transactions comprises the Merkle roots $N_{\{1,2,3,4\}}$, $N_{\{5,6\}}$ The second set of transactions comprises only two transactions. The second Merkle tree shard comprises the Merkle root labelled by $N_{\{7,8\}}$. To generate the overall Merkle root representing both sets of transactions, the Merkle roots $N_{\{5,6\}}$ and $N_{\{7,8\}}$ are concatenated and hashed to produce a first hash result (solid black circle shown above those Merkle roots), which is then concatenated with Merkle root $N_{\{1,2,3,4\}}$ and hashed to produce a second hash result, which is the overall Merkle root $M_8$. In some examples, each Merkle tree shard may be generated by a different tree generator 402a, 402b, who may send the Merkle tree shards to a root generator 404 for generating the overall Merkle root.

For comparison, FIG. 5 also shows the Merkle root $M_8$ of a Merkle tree constructed based on the first set of transactions and the Merkle root $M_2$ of a Merkle tree constructed based on the second set of transactions.

As discussed above, each set of transactions is allocated into subsets, and a Merkle tree having a Merkle root is generated for each subset. In some examples, the Merkle root of the first subset is generated based on a hash of the first transaction in that subset and a Merkle proof for the first transaction. The Merkle proof is based on the other transactions in the first subset. In some examples, the first transaction in the first subset may not be available or accessible at the time of generating the other Merkle roots of the first Merkle shard and/or at the time of generating the Merkle proof for the first transaction. The other Merkle roots and/or the Merkle proof may be pre-computed, with the Merkle root of the first subset being computed once the first transaction becomes available or accessible. For example, the first transaction may be a coinbase transaction that may change during the proof-of-work computation. This is because the nonce and/or extra nonce that is used to solve the proof-of-work puzzle and is included in the coinbase transaction is iteratively changed until the puzzle is solved. In these examples, the first transaction may also be referred to as a placeholder transaction.

Figure 6:
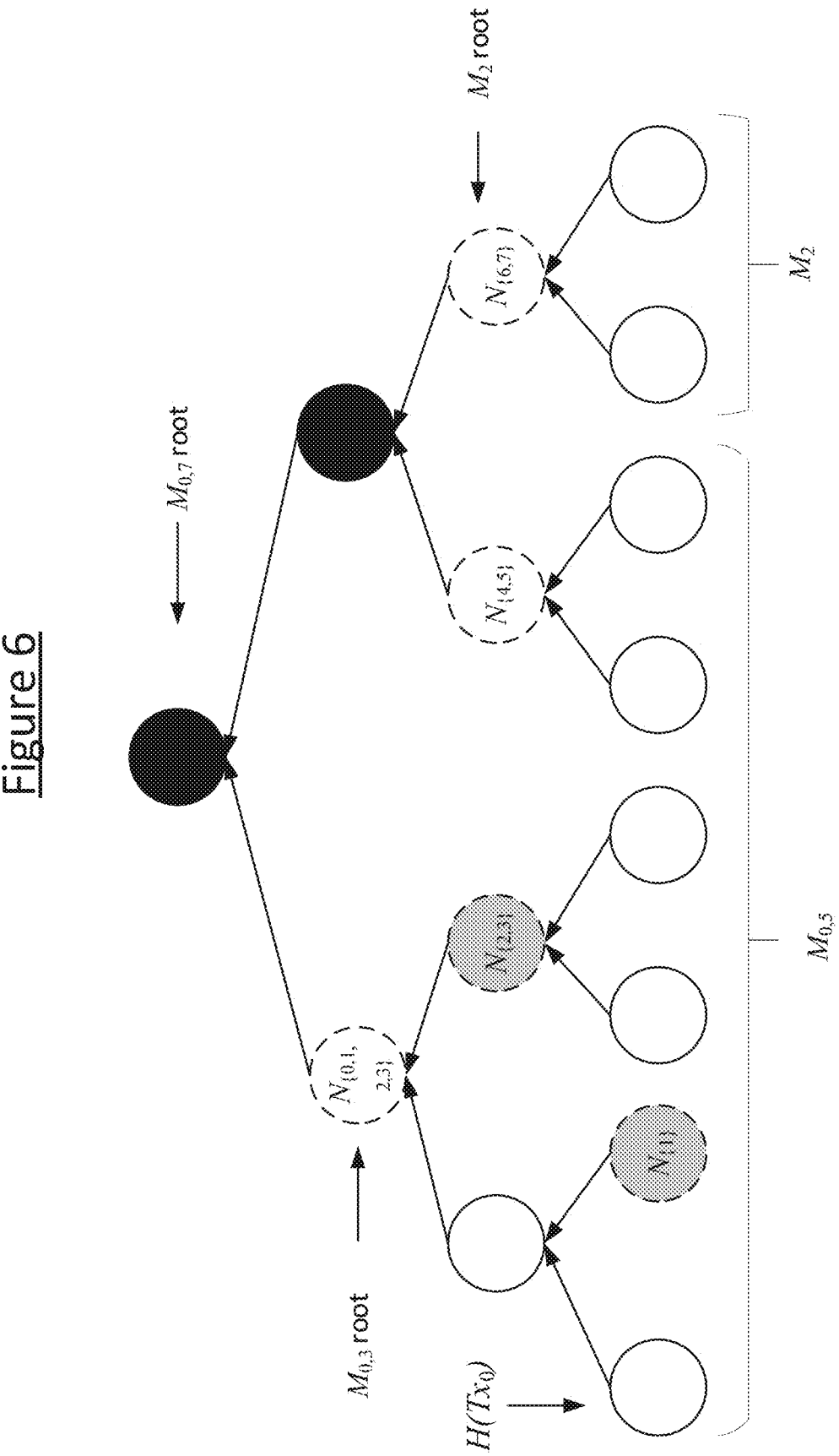

FIG. 6 illustrates an example of how the Merkle root of the first subset of transactions may be calculated based on the placeholder transaction and a Merkle proof for the placeholder transaction. In this example, the placeholder transaction is labelled $Tx_0$. The Merkle proof comprises a hash $N_{\{1\}}$ of the adjacent transaction $Tx_1$, and a hash $N_{\{2,3\}}$ generated by concatenating and hashing the next two transactions $Tx_2$, $Tx_3$. In general, the Merkle proof comprises a hash from each level of the tree below the Merkle root. The placeholder transaction is hashed $Tx_0$ and concatenated with hash $N_{\{1\}}$. The result is concatenated with hash $N_{\{2,3\}}$ and then hashed to produce the Merkle root $N_{\{1,2,3,4\}}$.

In some embodiments, the first tree generator 402a may generate a Coinbase Merkle tree shard representing a first group of transactions comprising a placeholder transaction (e.g. a coinbase transaction) and the first set of transactions. The placeholder transaction may or may not be available at the time of generating the Coinbase Merkle tree shard. The group of transactions are allocated into subsets. The placeholder transaction is allocated to the first subset and occupies the first (i.e. initial position) in the first subset. The number of transactions in each subset is a power of the same number, e.g. 2. The group of transactions may be split into the fewest number of subsets that still satisfies these requirements.

The first tree generator 402a generates a Merkle proof for the placeholder transaction using the other transactions in the first subset. This is still possible when the placeholder transaction is not available since the Merkle proof is not dependent on the placeholder transaction. The first tree generator 402a also generates a respective Merkle tree for each other subset, each of which has a respective Merkle root. The first Coinbase Merkle shard representing the first group of transactions comprises the Merkle proof and each of the respective Merkle roots.

The first tree generator 402a may send the first Coinbase Merkle shard to the tree generator 404 for generating a Merkle root (a "block Merkle root") based on the first Coinbase Merkle tree shard and one or more additional Merkle tree shards (note that these are Merkle tree shards, not additional Coinbase Merkle tree shards). Alternatively, the first tree generator 402a may obtain (e.g. generate and/or receive) one or more additional Merkle tree shards and generate a Merkle root based on the first Coinbase Merkle tree shard and the one or more additional Merkle tree shards. Note that the block Merkle root is used merely as a distinguishing label for the Merkle root that is generated, and does not necessarily imply that the Merkle root represents a block of transaction, though that is not excluded. The block Merkle root will represent the first group of transactions (i.e. the placeholder transaction and the first set of transactions) and each other set of transactions that is represented by a respective Merkle tree shard.

The placeholder transaction is obtained (e.g. generated or received) by the tree generator 404 and hashed. A Merkle root representing the first subset of transactions of the group of transactions is then generated using the hashed transaction and the Merkle proof for the placeholder transaction, which is included in the first Coinbase Merkle tree shard. The process of generating a Merkle root in this way was described above. Thus, in effect, a Merkle tree shard is generated which represents the first group of transactions. This Merkle tree shard includes the Merkle root of the Merkle tree constructed using the placeholder transaction and the Merkle proof, prepended to the Merkle roots included in the first Coinbase Merkle tree shard.

The block Merkle root is then constructed by merging the Merkle tree shards as described above. The process of first constructing a Merkle tree shard using the placeholder transaction and the Coinbase Merkle tree shard, and merging the Merkle tree shard with one or more additional Merkle tree shards is referred to as "prepend and merge". This process is illustrated in FIG. 6. In this example, the placeholder transaction is labelled $Tx_0$, as discussed above. The first group of transactions includes $Tx_0$, $Tx_1$, $Tx_2$, $Tx_3$, $Tx_4$ and $Tx_5$, and is divided into two subsets. A first subset includes $Tx_0$, $Tx_1$, $Tx_2$, $Tx_3$, and the second subset includes $Tx_4$ and $Tx_5$. The Coinbase Merkle tree shard includes a Merkle proof for $Tx_0$ (indicated by shaded nodes $N_{\{1\}}$ and $N_{\{2,3\}}$) and the Merkle root $N_{\{4,5\}}$ of the Merkle tree generated based on the second subset. A block of transactions includes the first group of transactions and a second set of transactions, $Tx_4$ and $Tx_5$. A Merkle root $N_{\{0,1,2,3\}}$ of the first subset of the first group is generated using and the Merkle proof. A block Merkle root is then constructed based on the Merkle roots $N_{\{0,1,2,3\}}$, $N_{\{4,5\}}$ and $N_{\{6,7\}}$.

In embodiments where the data items are blockchain transactions, the first tree generator 402a may generate a first sub-block for the first group of transactions. Recall that the first group of transactions comprises a placeholder transaction and a first set of transactions. In these examples, the placeholder transaction is a Coinbase transaction. The first sub-block comprises a sub-block header and the first set of transactions. The sub-block header comprises a Merkle shard generated based on the first set of transactions, and a Coinbase Merkle shard generated based on the first group of transactions. The sub-block header may also comprise the number of transactions in the first set of transactions. The transaction fees collected by the first set of transactions may also be included in the sub-block header. FIG. 7 illustrates an example sub-block 700 for a first group of transaction comprising a Coinbase transaction and six transactions. The Coinbase transaction is not included in the sub-block as it is constructed by a block processor.

Figure 8:
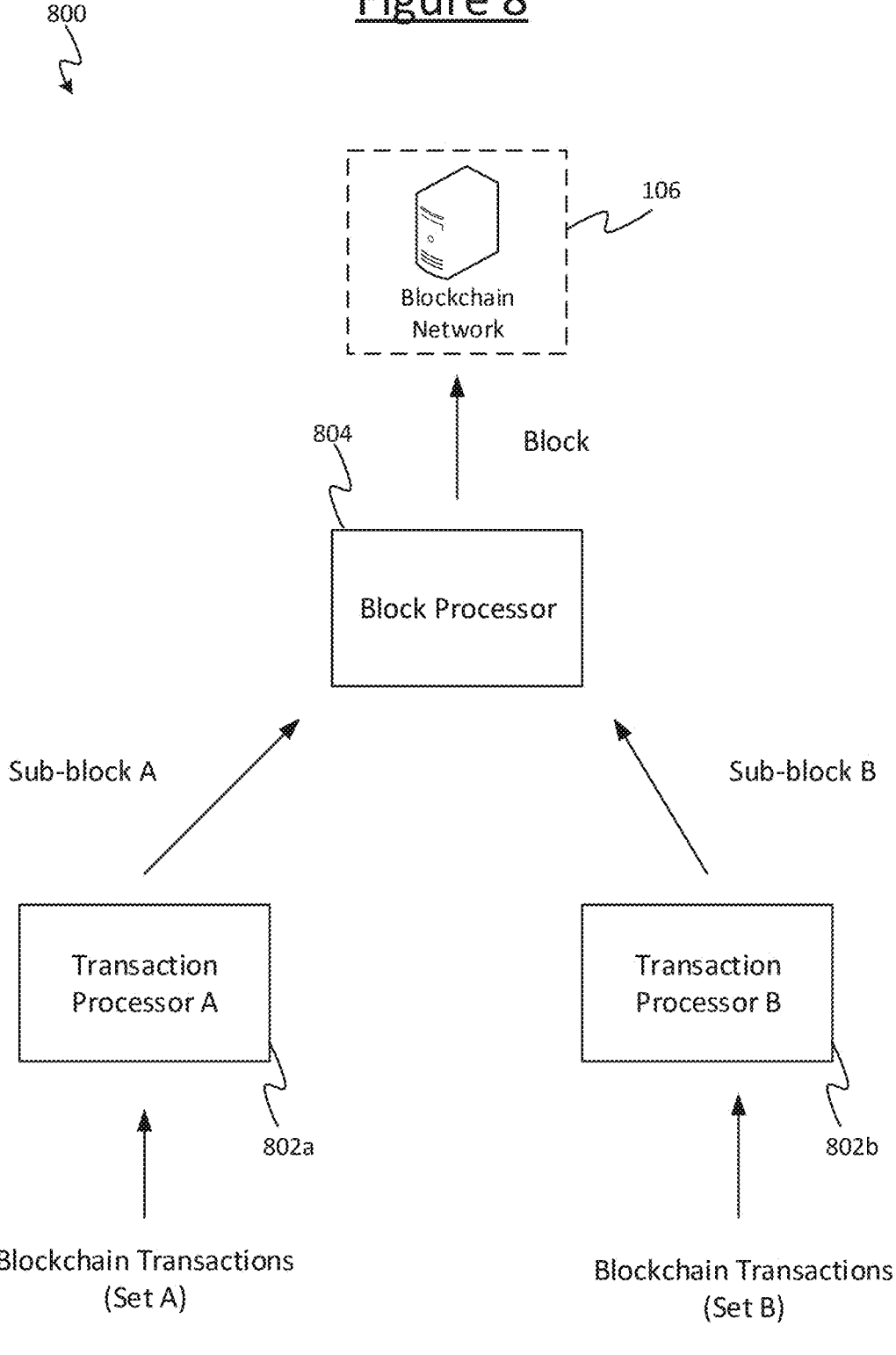
FIG. 8 is a schematic block diagram of a system for constructing a block Merkle root, and FIG. 9 schematically illustrates an example network of transaction processing devices and proof-of-work computation devices.

FIG. 8 illustrates an example system 800 for constructing a block based on one or more sub-blocks. As shown, the system includes one or more transaction processors 802, each configured to transmit a sub-block to a block processor 804. The transaction processors are configured to perform the actions described above as being performed by the tree generators 402. Similarly, the block processor 804 is configured to perform the actions described above as being performed by the root generator 804. In some examples, the block processor 804 may also be a transaction processor 802. Each transaction processor 802 may be configured to validate transactions according to the blockchain protocol, such that each sub-block comprises only valid transactions.

The block processor 804 receives multiple sub-blocks (or at least the sub-block headers), e.g. one from each transaction processor 802. A given transaction processor 802 may also generate multiple sub-blocks. Each sub-block header comprises a respective Coinbase Merkle tree shard and a respective Merkle tree shard generated based on a respective group of transactions. The block processor is configured to generate a block Merkle root based on the Coinbase Merkle tree shard of one of the sub-blocks and the Merkle tree shard of each other sub-block. Only one Coinbase Merkle tree shard is used to generate the block Merkle root. The Coinbase Merkle tree shard that is used is the one whose sub-block comprises the most transactions. The block processor 804 thus determines which sub-block comprises the most transactions, e.g. based on an indication included in the sub-block header, extracts the Coinbase Merkle tree shard from the sub-block header of that sub-block, extracts the Merkle tree shard from each other sub-block header, and constructs the block Merkle root. To construct the block Merkle root, the block processor 804 generates a coinbase transaction, hashes the coinbase transaction, and generates a Merkle tree using the Merkle proof from the extracted Coinbase Merkle tree shard. The block Merkle root is then generated as described above with reference to FIG. 6. The coinbase transaction may collect the fees from the sub-blocks. Computing the Coinbase Merkle tree shard in advance for each subblock minimises the computation time at the point of proof-of-work computation.

The block processor 804 may submit a block comprising the block Merkle root to the blockchain network 106, or to another entity, e.g. a blockchain node 104, for creating the block.

6. Sharded Merkle Trees for Blcockchain

This section describes further specific examples of the described embodiments. In this section it is shown how to compute the Merkle root resulting from merging several Merkle trees of transactions, and how to prepend a coinbase transaction to a given Merkle tree. Whilst these examples are described in terms of binary Merkle trees, other types of hash tree may be used, e.g. tertiary hash trees. In general, any n-ary hash trees may be used.

6.1 Merging Merkle Trees

Assume we have two sets of transactions $Tx_1, \ldots, Tx_n$ and $Tx_{n+1}, \ldots, Tx_{n+m}$. We denote the Merkle tree of each set by $M_n$ and $M_m$. In this sub-section we show how to compute the root of the tree $M_{m+n}$ with m+n transactions.

The simplest method is to compute the entire tree starting from the combined set of transactions. There is an alternative method where we do not need to compute the entire tree. Instead, one can compute the root using a number of tree nodes from the Merkle trees $M_n$ and $M_m$. To do this, one may identify the minimum number of nodes from each tree that are required to compute the merged Merkle tree. This is done by finding the nodes corresponding to subsets of transactions containing a power-of-two number of transactions.

We first create the set of Merkle tree nodes from $M_n$ and $M_m$ that are necessary to compute the root of the Merkle tree $M_{n+m}$. This may be done by the following procedure:

--- create_merkle_tree_shard
Inputs: n, $Tx_1, \ldots, Tx_n$
1.   Write n in binary $a_k a_{k-1} \ldots a_0$, where $a_k = 1$ and $a_i = \{0,1\}$ for i = 0, ... , k − 1.
2.   For each $a_i = 1$, i = 0, ... k, output the Merkle tree node
     $N_{\{[a_k a_{k-1} \ldots a_{i+1}]+1, \ldots, [a_k \ldots a_i]\}}$, where $[a_k a_{k-1} \ldots a_i] = 2^k a_k + 2^{k-1} a_{k-1} + \ldots + 2^i a_i$.

---

If we count the number of times $a_i = 1$ appears, then there are $a_k + \ldots + a_0 \leq 1 + \log_2 n$ Merkle tree nodes from $M_n$ needed to compute the root of $M_{n+m}$. We call this set of tree nodes a Merkle tree shard of $M_n$ and denote it by $\mathcal{M}_n$.

Similarly we create the Merkle tree shard $\mathcal{M}_m$ of $M_m$ by calling create_merkle_tree_shard with inputs m, $Tx_{n+1}, \ldots, Tx_{n+m}$.

The following procedure shows how to use $\mathcal{M}_n$ and $\mathcal{M}_m$ to compute the Merkle root of $M_{n+m}$:

The leaves in the resulting Merkle tree are a mixture of the transactions from the two sets, although merge_merkle_tree_shards preserves the order of the transactions with respect to their original set.

This means if there are any dependencies where a transaction spends another, the ordering is still in line with that required by topological transaction ordering.

This procedure can be generalised to compute the Merkle root of multiple Merkle tree shards by arranging all elements in increasing order by tree level. For s Merkle tree shards the algorithm executes in logarithm time. More precisely, assume the total number of transactions is 2. Each Merkle tree shard has at most $\log_2 \Sigma$ nodes. Then in total there are s log Σ nodes we arrange in Step 1. To compute the Merkle root (Steps 2a-2f) out of s $\log_2 \Sigma$ nodes it takes O(s $\log_2 \Sigma \cdot \log_2(s \log_2 \Sigma))$ steps. Thus, the time-complexity of this algorithm is O(s $\log_2 \Sigma \cdot \log_2$ (s $\log_2 \Sigma$)). A Merkle root with n transactions is computed in time O(n $\log_2$ n). Then an upper bound for the computation of the root from Merkle shards is given by O(s $\log_2 \Sigma \cdot \log_2$ (s $\log_2 \Sigma$)) where s $\log_2 \Sigma$ is an upper bound for number of transactions in each Merkle tree.

We now give an example, taking n=6 and m=2. FIG. 5 shows the Merkle trees $M_6$ and $M_2$ and the resulting Merkle tree Mg. The algorithm create_merkle_tree_shard is run twice and outputs the Merkle tree shard $\mathcal{M}_6 = \{N_{\{1,2,3,4\}}, N_{\{5,6\}}\}$ and the Merkle tree shard $\mathcal{M}_2 = \{N_{\{7,8\}}\}$. By running merge_merkle_tree_shards given $\mathcal{M}_6$ and $\mathcal{M}_2$ as input, we obtain the Merkle root $M_8$.

6.2 Prepend a Coinbase Transaction

Assume we have $Tx_1, \ldots, Tx_n$ and want to prepend a coinbase transaction $Tx_0$ to the set. Consider the Merkle proof $\mathcal{P}_{0,n}$ of $Tx_0$ in the Merkle tree $M_{0,n}$ (e.g. grey nodes in FIG. 6 for $M_{0,3}$). The Merkle proof is created using only the set $Tx_1, \ldots, Tx_n$ and can be precomputed before $Tx_0$ is added to the set of transactions. When $Tx_0$ is added, we compute the Merkle tree root of $M_{0,n}$ using the following procedure:

--- merge_merkle_tree_shards
Inputs: $\mathcal{M}_n, \mathcal{M}_m$
1.   Arrange all elements of $\mathcal{M}_n$ and $\mathcal{M}_m$ by tree level (Section 2) in increasing order.
2.   For each level l, starting with the lowest level:
     a.   If there is only one node on this level and none on any higher level, execute Step 3.
     b.   If there is only one node on this level, then duplicate it.
     c.   Concatenate and hash the first two nodes on level l (e.g. for l = 1, the hash result is the black node obtained from $N_{\{5,6\}}$ and $N_{\{7,8\}}$ in Figure 5).
     d.   Append the output of the hash to the set of nodes on level l + 1.
     e.   Remove the first two nodes on level l.
     f.   If there are nodes left on level l, go to step 2b. Otherwise, go to the next level.
3.   Output the Merkle root.

---

```
prepend_coinbase
Input: Tx₀, 𝒫₀,ₙ = {P₁, P₂, ... , Pₚ}.
    1.    Compute the node R₀ := N₍₀₎ (the transaction ID of Tx₀)
    2.    Compute Rᵢ₊₁ = H(Rᵢ‖Rᵢ₊₁), for each i = 0, ... , p – 1
    3.    Output Rₚ.
```

The output of this procedure is the Merkle root of $M_{0,n}$.

6.3 Prepend and Merge

We combine the ideas in Sections 6.1 and 6.2, that is to merge transaction sets $Tx_1, \ldots, Tx_n$ and $Tx_{n+1}, \ldots, Tx_{n+m}$ and simultaneously prepend a coinbase transaction $Tx_0$. We assume that n>m.

The procedure below returns the collection of Merkle tree nodes that can be used to efficiently prepend $Tx_0$ in the Merkle tree $M_n$ such that we can also merge $M_{0,n}$ with $M_m$.

```
create_coinbase_merkle_tree_shard
Inputs: n, Tx₁, ... , Txₙ
    1.    Write n + 1 in binary aₖaₖ₋₁ ... a₀ such that aₖ = 1 and aᵢ ∈ {0,1}, i =
          0, ... , k – 1.
    2.    Split the set of n transactions into Tx₁, ... , Tx_{l–1} and Tx_l, ... , Txₙ where l = 2ᵏ.
    3.    Compute the Merkle proof 𝒫₀,_{l–1} of Tx₀ in the transaction set Tx₀, ... , Tx_{l–1}.
    4.    Call create_merkle_tree_shard (Section 6.1) with inputs l, Tx_l, ... , Txₙ which
          outputs a Merkle tree shard denoted by ℳ_{l,n}.
    5.    Return 𝒫₀,_{l–1} and ℳ_{l,n}.
```

The output of this algorithm is called a coinbase Merkle tree shard $\mathcal{CM}_n$ of $M_n$ and we have $\mathcal{CM}_n = \{\mathcal{P}_{0,l-1}, \mathcal{M}_{l,n}\}$. Then the highest level node (the root of $M_{0,l-1}$) of the Merkle tree shard $\mathcal{M}_{0,n}$ of $\mathcal{M}_{0,n}$ can be computed using prepend_coinbase with inputs $Tx_0$ and $\mathcal{P}_{0,l-1}$. This node combined with $\mathcal{M}_{l,n}$ gives $\mathcal{M}_{0,n}$.

We show how to prepend $Tx_0$ and compute the Merkle root of $M_{0,n+m}$ using $\mathcal{CM}_n$ and $\mathcal{M}_m$ in the following way.

```
prepend_merge
Input: Tx₀, 𝒞ℳₙ = { 𝒫₀,_{l–1}, ℳ_{l,n}}, ℳ_m
    1.    Call prepend_coinbase (Section 6.2) with inputs Tx₀ and 𝒫₀,_{l–1}, which outputs
          the Merkle root of M₀,_{l–1}.
    2.    Prepend the Merkle root of M₀,_{l–1} to ℳ_{l,n} which gives ℳ₀,ₙ.
    3.    Call merge_merkle_tree_shards (Section 6.1) with inputs ℳ₀,ₙ and ℳ_m,
          which
          outputs the Merkle root of M₀,ₙ₊ₘ.
```

The assumption n>m ensures that the root of $M_{0,l-1}$ is the node with the highest level among the nodes in $\mathcal{M}_{0,n}$ and $\mathcal{M}_m$. Consequently by executing Step 3, $Tx_0$ is always the first transaction in the Merkle tree with the highest root level. This ensures that $Tx_0$ is the first transaction in the Merkle tree $M_{0,n+m}$. FIG. 6 shows an example of prepending $Tx_0$ to $M_5$ and merging $M_{0,5}$ and $M_2$ to compute the root of $M_{0,7}$.

Similarly to the procedure merge_merkle_tree_shards in Section 6.1, this procedure can be generalised to compute the Merkle root from $Tx_0$, one coinbase Merkle tree shard and multiple Merkle tree shards.

7. Example Use Case-Layered Mining

When a transaction is received, a blockchain node validates it and adds it to the mempool. The node then creates a block of transactions by adding validated transactions to the block and performing Proof-of-Work (PoW). In this section we show how we can parallelise the block creation by introducing subblocks. We also describe a novel mining architecture.

7.1 Subblocks

A subblock is made out of a subblock header and a set of n transactions $Tx_1, \ldots, Tx_n$. We assume the transactions in the subblock have been validated. The header contains:

a Merkle tree shard obtained by executing create_merkle_tree_shard in Section 6.1 for n transactions a coinbase Merkle tree shard computed by create_coinbase_merkle_tree_shard in Section 6.3 total transaction fees (optional)

n—the number of transactions and/or the respective tree levels of the Merkle root nodes (optional)

The total transaction fees and the number of transactions and/or the respective tree levels of the Merkle root nodes may be communicated in an alternative way, e.g. via separate messages.

The information stored in a subblock header is significant for a small number of transactions, but as the size of the transaction set increases, the subblock header will stay small in comparison to the size of the transaction set. More precisely, the subblock header contains one Merkle tree shard and one coinbase Merkle tree shard that are both logarithmic in the size of the transaction set.

To compute the block header from a coinbase transaction $Tx_0$ and the data in the headers of a set of subblocks $S_1, \ldots, S_k$ we execute the following procedure:

```
create_block_header
Inputs: Tx₀, headers of subblocks S₁, ... , Sₖ
    1.    Choose the subblock with most transactions S_{max}.
    2.    Call prepend_merge (Section 6.3) with inputs Tx₀, the coinbase Merkle tree
          shard in S_{max} and the Merkle tree shards in the rest of the subblock headers.
          This outputs the Merkle root of all transactions.
    3.    Create the block header adding the Merkle root computed in Step 2.
```

The only coinbase Merkle tree shard used by the algorithm is the one in subblock $S_{max}$. All other subblocks are merged using Merkle tree shards. The structure of the subblock header can be optimised if the subblock with the largest set of transactions is known ahead of creating the block. In this case, the header of the subblock $S_{max}$ will only contain the coinbase Merkle tree shard and transaction fees. Furthermore, all other subblock headers will only contain the Merkle tree shard and transaction fees.

7.2 Mandala Network Topology

We define a transaction processing unit (TPU) as a processing chip equipped with internal memory that performs transaction validation and creates subblocks (Section 7.1). Furthermore, a PoW unit is a computing chip responsible for creating blocks from subblocks and executing PoW. In this section we show how TPUs and PoW units can communicate in order to validate transactions, create a block and perform Proof-of-Work (PoW).

Figure 9:
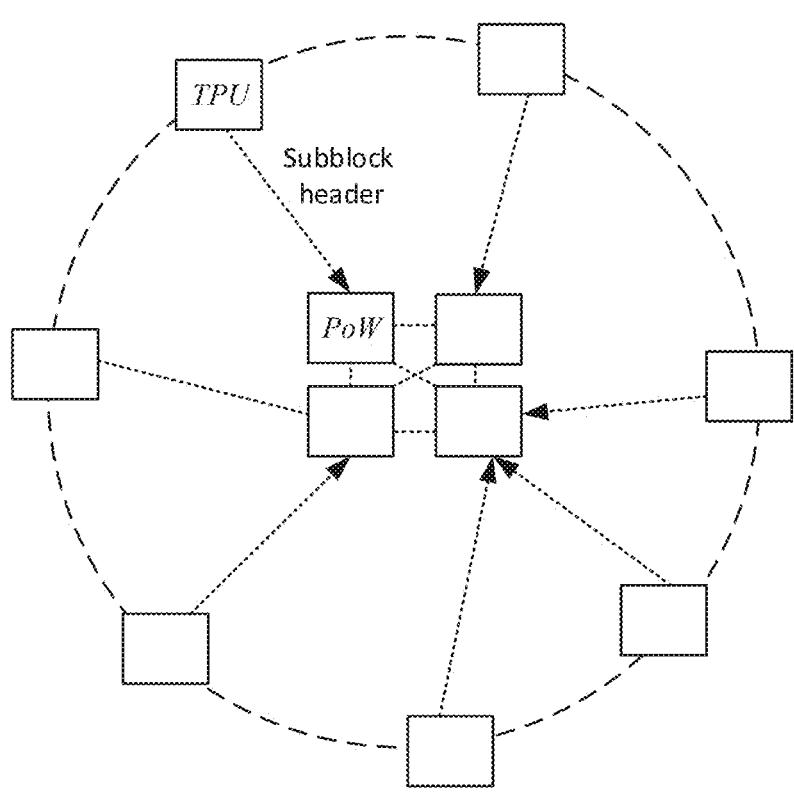

TPUs and PoW units are linked to create a network. For example, the network may be a Mandala network with two layers. Mandala networks refer to a family of networks which are fast and cost-effective, yet robust against failures and attacks. They are built up in layers, or shells/generations, and their name derives from their visual similarity to Mandala images. They are defined as a mathematical graph with certain rules for the distribution of nodes and edges in each shell, and how they connect to nodes in the shell below. In the basic method for construction, Mandala networks are characterised by three parameters $(n_1, b, \lambda)$, where $n_1$ is the number of nodes in the first generation, b is the number of new nodes added to each node in subsequent shells, and A is the number of connections between nodes in the same shell (other than the first shell). The choice of these parameters determines a type of Mandala network, where a unique Mandala network is determined by type and total number of shells. The choice for this topology will be discussed in Section 7.3 where we show how this model can be deployed in a production setting. FIG. 9 shows a representation of an example system.

We assume that the TPUs are trusted and that the communication between TPUs and PoW units is secure. For example, a miner node can be composed of several TPUs and PoW units. The outer layer (Layer 2) is made out of TPUs and the inner layer (Layer 1) is made out of PoW units. The execution flow starting from transaction validation to PoW follows the Steps below:

Each TPU executes:
1. Validates any received transaction
2. Creates a subblock from the set of validated transactions
3. Sends the subblock header to a PoW unit on Layer 1

The designated PoW unit on Layer 1 executes POW:
4. Create the coinbase transaction accumulating all the fees in the subblock headers (the fee information may be included in each subblock).
5. Create the block header by calling the procedure create_block_header in Section 7.1.
6. If the block hash is below the difficulty target then end execution. Otherwise, go to Step 7.
7. Increment the nonce field and execute Step 6.
8. If the nonce field is exhausted:
   a. Increment the extra nonce field in the coinbase transaction
   b. Reset the nonce field to 0
   c. Go to Step 5.

The PoW units on Layer 1 do not have to store the transactions of the block. They are responsible only for assembling the block header and executing PoW. The transaction set of the block exists implicitly across the TPUs and is uniquely identified through the Merkle root in the header. In this case the PoW unit acts as a coordinator that is aware of which parts of the transaction sets exist in which TPUs. Alternatively, the whole transaction set can later be constructed and sent to a storage unit.

Furthermore, we note that Step 5 is the most expensive step performed by the computing units on Layer 2. To optimise the PoW for incrementing the nonce field of the block headers, PoW units can execute Step 7 and 8 in parallel. This way the units can precompute the Merkle roots and block hashes with increased extra non fields so that they are readily available when the nonce field is exhausted.

7.3 Edge-Cloud Deployment

In an Edge-Cloud architecture a big part of computing tasks is shifted to edge devices, known as Edge computing. Edge computing refers to IoT-devices and computing units close to 5G antennas, whereas Cloud computing refers to high performant data centres that are well connected.

This creates many opportunities for businesses that want to provide low-latency computing services. This is because edge devices sit closer to a user requesting the computation of a chain of tasks, whereas cloud computing can be slower due to high internet communication latencies. For example, the user can have small tasks computed on edge devices and large ones on the cloud.

The network topology presented in Section 7.2 is fit to be used in an Edge-Cloud computing framework where TPUs are edge devices and the PoW units are Cloud servers. This ensures users have very low communication overhead with the mining network through a TPU. This is because a TPU can be very close in distance to a user, thus providing the capability for high zero-confirmation speeds.

Furthermore, TPUs can be responsible for collecting user payment chains in a single subblock that can then be mined in a block by a PoW unit on Layer 1. This is beneficial when we need to ensure the order of the chain of transactions within a block.

8. Further Remarks

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of representing a first set of data items, wherein the method is performed by a first tree generator and comprises:
allocating the first set of data items into a plurality of respective subsets;
for each respective subset of data items, generating a respective hash tree based on the respective subset of data items, wherein the respective hash tree comprises a respective root node; and
generating a respective first hash set representing the first set of data items, wherein the first hash set comprises each of the respective root nodes.

In embodiments, the number of transactions in each subset is a power of two. More generally, the number of transactions in each subset is a power of n, where n may be, for example, two, three, four, etc.

Statement 2. The method of statement 1, wherein one or more additional respective first hash sets are generated for respective sets of data items, and wherein the method comprises:
outputting the generated first hash set to a root generator configured to generate a first overall root node representing each respective set of data items, wherein the first overall root node is generated based on each of the respective first hash sets.

Statement 3. The method of statement 2, wherein the first tree generator comprises the root generator, and wherein the method comprises:
obtaining the one or more additional respective first hash sets; and
generating the first overall root node.

Statement 4. The method of statement 3, wherein said obtaining of the one or more additional respective first hash sets comprises generating at least one of the one or more additional respective first hash sets and/or receiving at least one of the one or more additional respective first hash sets.

Statement 5. The method of statement 2, wherein said outputting of the first hash set comprises transmitting the first hash set to the root generator.

Statement 6. The method of statement 2 or any statement dependent thereon, wherein each respective root node is associated with a respective tree level of the respective hash tree, and wherein the first overall root node is generated by performing the following steps:
a) arranging the respective root nodes in a dataset in order based on the respective tree levels; and
b) for each respective tree level, starting with a lowest tree level comprising at least one respective root node, performing the following sub-steps:
i) if the respective tree level consists of a single respective root node and there are no respective root nodes on any higher tree level, execute step c);
ii) if the respective tree level consists of a single respective root node and there are one or more respective root nodes on at least one higher tree level, duplicating the respective root node;
iii) concatenating and hashing the first two respective root nodes of the respective tree level to generate a respective hash result;
iv) appending the respective hash result to the respective root nodes of the next respective tree level and treating those respective hash results as respective root nodes of the next respective tree level; and
v) removing said first two respective root nodes from the respective tree level;
vi) if there are one or more respective tree nodes remaining for the respective tree level, returning to sub-step ii), otherwise, performing sub-steps i) to vi) for the next respective tree level; and
c) outputting the first overall root node.

Statement 7. The method of any preceding statement, wherein the respective root node of the first subset of data items is generated by:
generating a hash of the first data item;
generating a hash proof for a first data item based on one or more other data items of the first subset;
generating the respective root node of the first subset based on the hash of the first data item and the hash proof.

Statement 8. The method of any of statements 1 to 6, wherein a first group of data items comprises a placeholder data item and the first set of data items, and wherein the method comprises:
allocating the first group of data items into a plurality of respective subsets, and wherein a first subset comprises the placeholder data item;
for the first subset of data items, generating a hash proof for the placeholder item based on each other data item in the first subset;
for each other respective subset of data items, generating a respective hash tree based on the respective subset of data items, wherein the respective hash tree comprises a respective root node; and
generating a second hash set representing the first group of data items, wherein the second hash set comprises the hash proof for the placeholder data item and each of the respective root nodes generated based on the other respective subsets.

Statement 9. The method of statement 8, wherein the placeholder data item is not accessible at the time of generating the second hash set.

Statement 10. The method of statement 8 or statement 9, wherein one or more additional respective first hash sets are generated for respective sets of data items, and wherein the method comprises:

outputting the second hash set to a root generator configured to generate a second overall root node representing the first group of data items and the respective sets of data items represented by the one or more additional respective first hash sets, wherein the second overall root node is generated based on the second hash set and one or more additional respective first hash sets, each representing a respective set of data items.

Statement 11. The method of statement 10, wherein each respective root node is associated with a respective tree level of the respective hash tree, and wherein the second overall root node is generated by:

generating a hash of the placeholder data item;

generating the respective root node of the first subset based on the hash of the placeholder data item and the hash proof; and generating the second overall root node by performing the following steps:

a) arranging the respective root nodes in a dataset in order based on the respective tree levels; and b) for each respective tree level, starting with the lowest tree level comprising at least one respective root node, performing the following sub-steps:

i) if the respective tree level consists of a single respective root node and there are no respective root nodes on a higher tree level, execute step c);

ii) if the respective tree level consists of a single respective root node, duplicating the respective root node;

iii) concatenating and hashing the first two respective root nodes of the respective tree level to generate a respective hash result;

iv) appending the respective hash results to the respective root nodes of the next respective tree level and treating those respective hash results as respective root nodes of the next respective tree level;

v) removing said first two respective root nodes from the respective tree level;

vi) if there are one or more respective tree nodes remaining for the respective tree level, returning to sub-step ii), otherwise, performing sub-steps i) to vi) for the next respective tree level; and c) outputting the second overall root node.

Statement 12. The method of statement 11, wherein the first tree generator comprises the root generator, and wherein the method comprises:

obtaining the one or more additional respective first hash sets;

obtaining the placeholder data item; and generating the second overall root node.

Statement 13. The method of any preceding statement, wherein each data item is a respective blockchain transaction.

Statement 14. The method of statement 11 when dependent on statement 8, wherein the placeholder blockchain transaction is a generation transaction.

Statement 15. The method of statement 14 when dependent on statement 8, comprising:

generating a first sub-block associated with the first group of blockchain transactions, wherein the first sub-block comprises a first sub-block header, wherein the first sub-block header comprises the first hash set and the second hash set.

Statement 16. The method of statement 15, wherein one or more additional sub-blocks are generated for respective groups of blockchain transactions, each sub-block comprising a respective sub-block header, each respective sub-block header comprising a respective first hash set and a respective second hash set, and wherein the method comprises outputting at least the first sub-block header to the root generator configured to generate a block root node based on i) the respective second hash set of the respective sub-block header associated with the respective group of blockchain transactions comprising the most blockchain transactions, and ii) the respective first hash set of each other respective sub-block header.

Statement 17. The method of statement 16, comprising:

obtaining the one or more additional sub-block headers; and generating the block root node.

Statement 18. The method of statement 17, wherein said obtaining of the one or more additional sub-block headers comprises generating at least one of the one or more additional sub-block headers and/or receiving at least one of the one or more additional sub-block headers.

Statement 19. The method of statement 16, wherein said outputting of the first sub-block header comprises transmitting the first sub-block header to the root generator.

Statement 20. The method of statement 13 or any statement dependent thereon, comprising validating each of the blockchain transactions according to a blockchain protocol.

Statement 21. The method of statement 19, wherein the first sub-block comprises the first group of blockchain transactions, and wherein the method comprises transmitting the first sub-block to the root generator.

Statement 22. The method of statement 16 or any statement dependent thereon, wherein the first sub-block header comprises an indication of the number of blockchain transactions comprised by the first set of blockchain transactions.

Statement 23. The method of any preceding statement, wherein said allocating of the first set of data items into a plurality of respective subsets comprises allocating the first set of data items into the minimum number of subsets.

Statement 24. The method of statement 8 or any statement dependent thereon, wherein said allocating of the first group of data items into a plurality of respective subsets comprises allocating the first group of data items into the minimum number of subsets.

Statement 25. A computer-implemented method of generating an overall root node representing an overall set of data items, wherein the method is performed by a root generator and comprises:

obtaining one or more respective hash sets, wherein each respective hash set is generated by:

allocating a respective set of data items into a plurality of respective subsets, and for each respective subset of data items, generating a respective hash tree based on the respective subset of data items, wherein the respective hash tree comprises a respective root node, and wherein the respective hash set comprises each of the respective root nodes; and generating the root node based on each respective root node.

Statement 26. A computer-implemented method of generating a block root node representing a block of blockchain transactions, wherein the method comprises:

obtaining a plurality of respective sub-block headers, each respective sub-block header being associated with a respective group of blockchain transactions comprising a respective placeholder blockchain transaction and a respective set of blockchain transactions, wherein respective each sub-block header comprises a respective first hash set and a respective second hash set;

wherein the respective first hash set is generated by:
allocating the respective set of data items into a plurality of respective subsets;

for each respective subset of data items, generating a respective hash tree based on the respective subset of data items, wherein the respective hash tree comprises a respective root node, and wherein the respective first hash set comprises each of the respective root nodes;

wherein the respective second hash set is generated by:
allocating the respective first group of data items into a plurality of respective subsets, and wherein a first subset comprises the respective placeholder data item;

for the first subset of data items, generating a hash proof for the placeholder item based on each other data item in the first subset;

for each other respective subset of data items, generating a respective hash tree based on the respective subset of data items, wherein the respective hash tree comprises a respective root node, and wherein the respective second hash set comprises the hash proof for the respective placeholder data item and each of the respective root nodes, and wherein the method further comprises:

determining which respective sub-block header is associated with the respective group of blockchain transactions comprising the most blockchain transactions;

generating a generation transaction; and generating the block root node based on i) the generation transaction, ii) the respective second hash set of the respective sub-block header associated with the respective group of blockchain transactions comprising the most blockchain transactions, and iii) the respective first hash set of each other respective sub-block header.

Statement 27. The method of statement 26, comprising:
generating a block comprising each respective set of blockchain transactions and a block header, wherein the block header comprises the block root node; and submitting the block to one or more blockchain nodes of a blockchain network.

Statement 28. The method of statement 26, comprising:
transmitting the block root node to a blockchain node for generating a block comprising each respective set of blockchain transactions and a block header, wherein the block header comprises the block root node.

Statement 29. The method of statement 26 or any statement dependent thereon, wherein each sub-block header comprises a respective indication of the respective number of blockchain transactions comprised by the respective set of blockchain transactions.

Statement 30. Computer equipment comprising:
memory comprising one or more memory units; and processing apparatus comprising one or more processing units, wherein the memory stores code arranged to run on the processing apparatus, the code being configured so as when on the processing apparatus to perform the method of any preceding statement.

Statement 31. A computer program embodied on computer-readable storage and configured so as, when run on one or more processors, to perform the method of any of statements 1 to 29.

According to another aspect disclosed herein, there may be provided a method comprising the actions of the first tree generator and the root generator.

According to another aspect disclosed herein, there may be provided a system comprising the computer equipment of the first tree generator and the root generator.

The invention claimed is:

1. A computer-implemented method of representing a first set of data items, wherein a first group of data items comprises a placeholder data item and the first set of data items, wherein the method is performed by a first tree generator and comprises:

allocating the first group of data items into a plurality of respective subsets, wherein a first subset comprises the placeholder data item;

for the first subset of data items, generating a hash proof for the placeholder item based on each other data item in the first subset;

for each other respective subset of data items, generating a respective hash tree based on the respective subset of data items, wherein the respective hash tree comprises a respective root node;

generating a respective first hash set representing the first set of data items, wherein the first hash set comprises each of the respective root nodes; and generating a second hash set representing the first group of data items, wherein the second hash set comprises the hash proof for the placeholder data item and each of the respective root nodes generated based on the other respective subsets.

2. The method of claim 1, wherein one or more additional respective first hash sets are generated for respective sets of data items, and wherein the method comprises:

outputting the generated first hash set to a root generator configured to generate a first overall root node representing each respective set of data items, wherein the first overall root node is generated based on each of the respective first hash sets.

3. The method of claim 2, wherein the first tree generator comprises the root generator, and wherein the method comprises:

obtaining the one or more additional respective first hash sets; and generating the first overall root node.

4. The method of claim 3, wherein said obtaining of the one or more additional respective first hash sets comprises generating at least one of the one or more additional respective first hash sets and/or receiving at least one of the one or more additional respective first hash sets.

5. The method of claim 2, wherein said outputting of the first hash set comprises transmitting the first hash set to the root generator.

6. The method of claim 2, wherein each respective root node is associated with a respective tree level of the respective hash tree, and wherein the first overall root node is generated by performing the following steps:

a) arranging the respective root nodes in a dataset in order based on the respective tree levels; and b) for each respective tree level, starting with a lowest tree level comprising at least one respective root node, performing the following sub-steps:

i) if the respective tree level consists of a single respective root node and there are no respective root nodes on any higher tree level, execute step c);

ii) if the respective tree level consists of a single respective root node and there are one or more respective root nodes on at least one higher tree level, duplicating the respective root node;

iii) concatenating and hashing the first two respective root nodes of the respective tree level to generate a respective hash result;

iv) appending the respective hash result to the respective root nodes of a next respective tree level and treating those respective hash results as respective root nodes of the next respective tree level; and v) removing said first two respective root nodes from the respective tree level;

vi) if there are one or more respective tree nodes remaining for the respective tree level, returning to sub-step ii), otherwise, performing sub-steps i) to vi) for the next respective tree level; and c) outputting the first overall root node.

7. The method of claim 1, wherein the placeholder data item is not accessible at a time of generating the second hash set.

8. The method of claim 1, wherein one or more additional respective first hash sets are generated for respective sets of data items, and wherein the method comprises:

outputting the second hash set to a root generator configured to generate a second overall root node representing the first group of data items and the respective sets of data items represented by the one or more additional respective first hash sets, wherein the second overall root node is generated based on the second hash set and one or more additional respective first hash sets, each representing a respective set of data items.

9. The method of claim 8, wherein each respective root node is associated with a respective tree level of the respective hash tree, and wherein the second overall root node is generated by:

generating a hash of the placeholder data item;

generating the respective root node of the first subset based on the hash of the placeholder data item and the hash proof; and generating the second overall root node by performing the following steps:

a) arranging the respective root nodes in a dataset in order based on the respective tree levels; and b) for each respective tree level, starting with a lowest tree level comprising at least one respective root node, performing the following sub-steps:

i) if the respective tree level consists of a single respective root node and there are no respective root nodes on a higher tree level, execute step c);

ii) if the respective tree level consists of a single respective root node, duplicating the respective root node;

iii) concatenating and hashing the first two respective root nodes of the respective tree level to generate a respective hash result;

iv) appending the respective hash results to the respective root nodes of a next respective tree level and treating those respective hash results as respective root nodes of the next respective tree level;

v) removing said first two respective root nodes from the respective tree level;

vi) if there are one or more respective tree nodes remaining for the respective tree level, returning to sub-step ii), otherwise, performing sub-steps i) to vi) for the next respective tree level; and c) outputting the second overall root node.

10. The method of claim 9, wherein the first tree generator comprises the root generator, and wherein the method comprises:

obtaining the one or more additional respective first hash sets;

obtaining the placeholder data item; and generating the second overall root node.

11. The method of claim 1, wherein each data item is a respective blockchain transaction.

12. The method of claim 9, wherein the placeholder data item is a placeholder blockchain transaction that is a generation transaction.

13. The method of claim 11, comprising validating each of the blockchain transactions according to a blockchain protocol.

14. The method of claim 1, wherein said allocating of the first set of data items into a plurality of respective subsets comprises allocating the first set of data items into a minimum number of subsets.

15. The method of claim 1, wherein said allocating of the first group of data items into a plurality of respective subsets comprises allocating the first group of data items into a minimum number of subsets.

16. A computer-implemented method of generating a block root node representing a block of blockchain transactions, wherein the method comprises:

obtaining a plurality of respective sub-block headers, each respective sub-block header being associated with a respective group of blockchain transactions comprising a respective placeholder blockchain transaction and a respective set of blockchain transactions, wherein each respective sub-block header comprises a respective first hash set and a respective second hash set;

wherein the respective first hash set is generated by:

allocating a respective set of data items into a plurality of respective subsets;

for each respective subset of data items, generating a respective hash tree based on the respective subset of data items, wherein the respective hash tree comprises a respective root node, and wherein the respective first hash set comprises each of the respective root nodes;

wherein the respective second hash set is generated by:

allocating the respective first group of data items into a plurality of respective subsets, and wherein a first subset comprises a respective placeholder data item;

for the first subset of data items, generating a hash proof for the placeholder item based on each other data item in the first subset;

for each other respective subset of data items, generating a respective hash tree based on the respective subset of data items, wherein the respective hash tree comprises a respective root node, and wherein the respective second hash set comprises the hash proof for the respective placeholder data item and each of the respective root nodes, and wherein the method further comprises:

determining which respective sub-block header is associated with the respective group of blockchain transactions comprising the most blockchain transactions;

generating a generation transaction; and generating the block root node based on i) the generation transaction, ii) the respective second hash set of the respective sub-block header associated with the respective group of blockchain transactions comprising the most blockchain transactions, and iii) the respective first hash set of each other respective sub-block header.

17. Computer equipment, comprising:

memory comprising one or more memory units; and processing apparatus comprising one or more processing units, wherein the memory stores code arranged to run on the processing apparatus, the code being configured so as when run on the processing apparatus, the processing apparatus performs a method of representing a first set of data items, wherein a first group of data items comprises a placeholder data item and the first set of data items, wherein the method is performed by a first tree generator and comprises:

allocating the first group of data items into a plurality of respective subsets, wherein a first subset comprises the placeholder data item;

for the first subset of data items, generating a hash proof for the placeholder item based on each other data item in the first subset;

for each other respective subset of data items, generating a respective hash tree based on the respective subset of data items, wherein the respective hash tree comprises a respective root node;

generating a respective first hash set representing the first set of data items, wherein the first hash set comprises each of the respective root nodes; and generating a second hash set representing the first group of data items, wherein the second hash set comprises the hash proof for the placeholder data item and each of the respective root nodes generated based on the other respective subsets.

18. A computer program embodied on non-transitory computer-readable storage media and configured so as, when run on one or more processors, the one or more processors perform a method of representing a first set of data items, wherein a first group of data items comprises a placeholder data item and the first set of data items, wherein the method is performed by a first tree generator and comprises:

allocating the first group of data items into a plurality of respective subsets, wherein a first subset comprises the placeholder data item;

for the first subset of data items, generating a hash proof for the placeholder item based on each other data item in the first subset;

for each other respective subset of data items, generating a respective hash tree based on the respective subset of data items, wherein the respective hash tree comprises a respective root node;

generating a respective first hash set representing the first set of data items, wherein the first hash set comprises each of the respective root nodes; and generating a second hash set representing the first group of data items, wherein the second hash set comprises the hash proof for the placeholder data item and each of the respective root nodes generated based on the other respective subsets.

* * * * *